United States Patent
Ahn et al.

(10) Patent No.: US 8,649,559 B2
(45) Date of Patent: *Feb. 11, 2014

(54) METHOD AND INTERFACE OF RECOGNIZING USER'S DYNAMIC ORGAN GESTURE AND ELECTRIC-USING APPARATUS USING THE INTERFACE

(75) Inventors: Ji-Young Ahn, Gyeonggi-do (KR); Sung-Gae Lee, Gyeonggi-do (KR); Hyung-Joon Koo, Seoul (KR); Chang-Ick Kim, Daejeon (KR); Won-Jun Kim, Daejeon (KR); Min-Jin Kim, Seoul (KR)

(73) Assignees: LG Display Co., Ltd., Seoul (KR); Korea Advanced Instiute of Science and Technology, Daejeon (KR)

( * ) Notice: Subject to any disclaimer, the term of this patent is extended or adjusted under 35 U.S.C. 154(b) by 148 days.

This patent is subject to a terminal disclaimer.

(21) Appl. No.: 13/198,186

(22) Filed: Aug. 4, 2011

(65) Prior Publication Data

US 2012/0068920 A1 Mar. 22, 2012

(30) Foreign Application Priority Data

Sep. 17, 2010 (KR) .................. 10-2010-0091745

(51) Int. Cl.
*G06K 9/00* (2006.01)
(52) U.S. Cl.
USPC ............................ 382/103; 382/168; 382/181
(58) Field of Classification Search
USPC .................. 382/103, 168–173, 181, 190, 199
See application file for complete search history.

(56) References Cited

U.S. PATENT DOCUMENTS

| | | | | |
|---|---|---|---|---|
| 6,597,738 B1 * | 7/2003 | Park et al. | ............... | 375/240.16 |
| 7,551,980 B2 * | 6/2009 | Sakagami et al. | ............ | 700/258 |
| 7,849,421 B2 * | 12/2010 | Yoo et al. | ...................... | 715/863 |
| 8,014,567 B2 * | 9/2011 | Yoon et al. | .................... | 382/103 |
| 2004/0037460 A1 * | 2/2004 | Luo et al. | ...................... | 382/165 |
| 2007/0237387 A1 * | 10/2007 | Avidan et al. | ................. | 382/159 |
| 2008/0137957 A1 * | 6/2008 | Xu et al. | ...................... | 382/190 |
| 2010/0021056 A1 * | 1/2010 | Chen | ............................. | 382/165 |
| 2010/0092036 A1 * | 4/2010 | Das et al. | ..................... | 382/103 |
| 2010/0158363 A1 * | 6/2010 | Jiang et al. | ................... | 382/165 |
| 2010/0272366 A1 * | 10/2010 | Meng et al. | .................. | 382/190 |
| 2011/0211754 A1 * | 9/2011 | Litvak et al. | ................. | 382/165 |
| 2011/0255743 A1 * | 10/2011 | Guan et al. | ................... | 382/103 |
| 2011/0273621 A1 * | 11/2011 | Richardson et al. | .......... | 348/608 |

(Continued)

OTHER PUBLICATIONS

Elmezain, A Hidden Markov Model-Based Continuous Gesture Recognition System for Hand Motion Trajectory, IEEE Conference on Pattern Recognition, pp. 65-72, 2008.

(Continued)

*Primary Examiner* — Li Liu
(74) *Attorney, Agent, or Firm* — Morgan, Lewis & Bockius LLP

(57) ABSTRACT

A method of recognizing a user's dynamic organ for use in an electric-using apparatus includes scanning a target image inputted through an imaging element using a window; generating a HOG descriptor of a region of the target image that is scanned when it is judged that the scanned region includes a dynamic organ; measuring a resemblance value between the HOG descriptor of the scanned region and a HOG descriptor of a query template for a gesture of the dynamic organ; and judging that the scanned region includes the gesture of the dynamic organ when the resemblance value meets a predetermined condition.

18 Claims, 8 Drawing Sheets

(56) References Cited

U.S. PATENT DOCUMENTS

| | | | |
|---|---|---|---|
| 2011/0311129 A1* | 12/2011 | Milanfar et al. | 382/154 |
| 2011/0311137 A1* | 12/2011 | Liu et al. | 382/173 |
| 2012/0027252 A1* | 2/2012 | Liu et al. | 382/103 |
| 2012/0045117 A1* | 2/2012 | Li et al. | 382/154 |
| 2012/0051592 A1* | 3/2012 | Yashiro | 382/103 |
| 2012/0076361 A1* | 3/2012 | Fujiyoshi | 382/103 |
| 2012/0093360 A1* | 4/2012 | Subramanian et al. | 382/103 |
| 2012/0128243 A1* | 5/2012 | Singh et al. | 382/167 |
| 2012/0133580 A1* | 5/2012 | Kirby et al. | 345/156 |

OTHER PUBLICATIONS

Dalal, Histograms of Oriented Gradients for Human Detection, Proceeding of IEEE Conference on Computer Vision and Pattern Recognition, San Diego, CA., pp. 886-893, Jun. 2005.

* cited by examiner

METHOD AND INTERFACE OF RECOGNIZING USER'S DYNAMIC ORGAN GESTURE AND ELECTRIC-USING APPARATUS USING THE INTERFACE

The present invention claims the benefit of Korean Patent Application No. 10-2010-0091745, filed in Korea on Sep. 17, 2010, which is hereby incorporated by reference for all purposes as if fully set forth herein.

BACKGROUND OF THE INVENTION

1. Field of the Invention

The present invention relates to a method of recognizing a user's dynamic organ gesture, and more particularly, to method and interface of recognizing a user's dynamic organ gesture and an electric-using apparatus using the interface.

2. Discussion of the Related Art

As various multi-media systems are developed based upon image information, needs for technologies that understand information included in an image and apply the information to various fields increase. Particularly, much attention is on establishing an easier interface environment through recognition of a human's gesture such as a hand movement in an image.

However, in the related art, when background is complicated or a skin color region other than a hand exists, it is difficult to accurately recognize a hand.

A method of recognizing a hand gesture in the related art is briefly explained as follows. A learning based upon a Gaussian mixture model is conducted in a normalized RGB color space using a number of data sets. Using similarity to a model generated through the learning, a skin color image is detected in a frame image. Further, a hand movement image is generated using brightness difference between frame images. By applying the hand movement image to the detected skin color image, a hand likelihood image is generated. Using an integral image characteristic, a hand candidate region is detected from the hand likelihood image. Using a centric coordinate of the hand candidate region and an optical flow component, a hand gesture is finally judged.

The related art method as above has following problems. When a skin color region besides a hand region exists in an image, it is difficult to distinguish therebetween. Further, when something like a human's movement exists in a background, it is difficult to detect a hand movement. Further, many amounts of data sets are required, and, much time and effort are required to make a reliable model based upon the data sets. Further, the method is vulnerable to variation of an indoor lighting, and false detection of a hand movement frequently occurs due to noise of a camera that is used to take an image.

As described above, the related art method causes reduction of efficiency and reliability.

SUMMARY OF THE INVENTION

Accordingly, the present invention is directed to method and interface of recognizing a user's dynamic organ gesture and an electric-using apparatus using the interface which substantially obviates one or more of the problems due to limitations and disadvantages of the related art.

An advantage of the present invention is to provide method and interface of recognizing a user's dynamic organ gesture and an electric-using apparatus using the interface that can improve efficiency and reliability.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a method of recognizing a user's dynamic organ for use in an electric-using apparatus includes scanning a target image inputted through an imaging element using a window; generating a HOG descriptor of a region of the target image that is scanned when it is judged that the scanned region includes a dynamic organ; measuring a resemblance value between the HOG descriptor of the scanned region and a HOG descriptor of a query template for a gesture of the dynamic organ; and judging that the scanned region includes the gesture of the dynamic organ when the resemblance value meets a predetermined condition.

In another aspect, an interface for use in an electric-using apparatus includes an imaging element; and a dynamic organ gesture recognition portion that scans a target image inputted through the imaging element using a window; generates a HOG descriptor of a region of the target image that is scanned when it is judged that the scanned region includes a dynamic organ; measures a resemblance value between the HOG descriptor of the scanned region and a HOG descriptor of a query template for a gesture of the dynamic organ; and judges that the scanned region includes the gesture of the dynamic organ when the resemblance value meets a predetermined condition.

In yet another aspect, an electric-using apparatus includes an interface including a dynamic organ gesture recognition portion that scans a target image inputted through an imaging element using a window; generates a HOG descriptor of a region of the target image that is scanned when it is judged that the scanned region includes a dynamic organ; measures a resemblance value between the HOG descriptor of the scanned region and a HOG descriptor of a query template for a gesture of the dynamic organ; and judges that the scanned region includes the gesture of the dynamic organ when the resemblance value meets a predetermined condition; and a control circuit that controls operation of the electric-using apparatus according to recognition result of the gesture of the dynamic organ from the interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
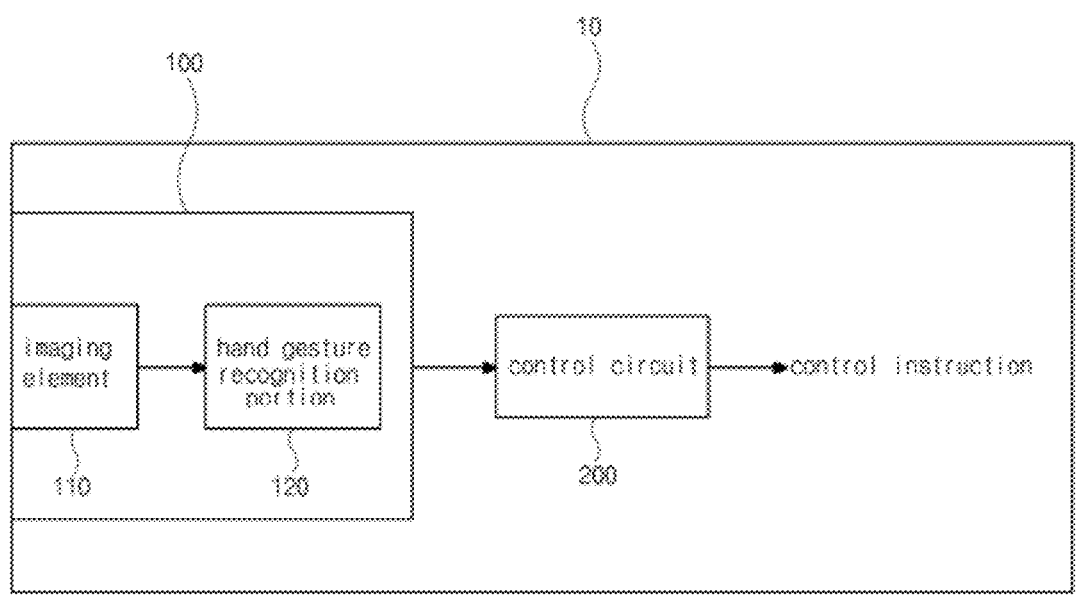
FIG. 1 is a schematic view illustrating an apparatus including an interface to recognize a hand gesture according to an embodiment of the present invention.
Figure 2:
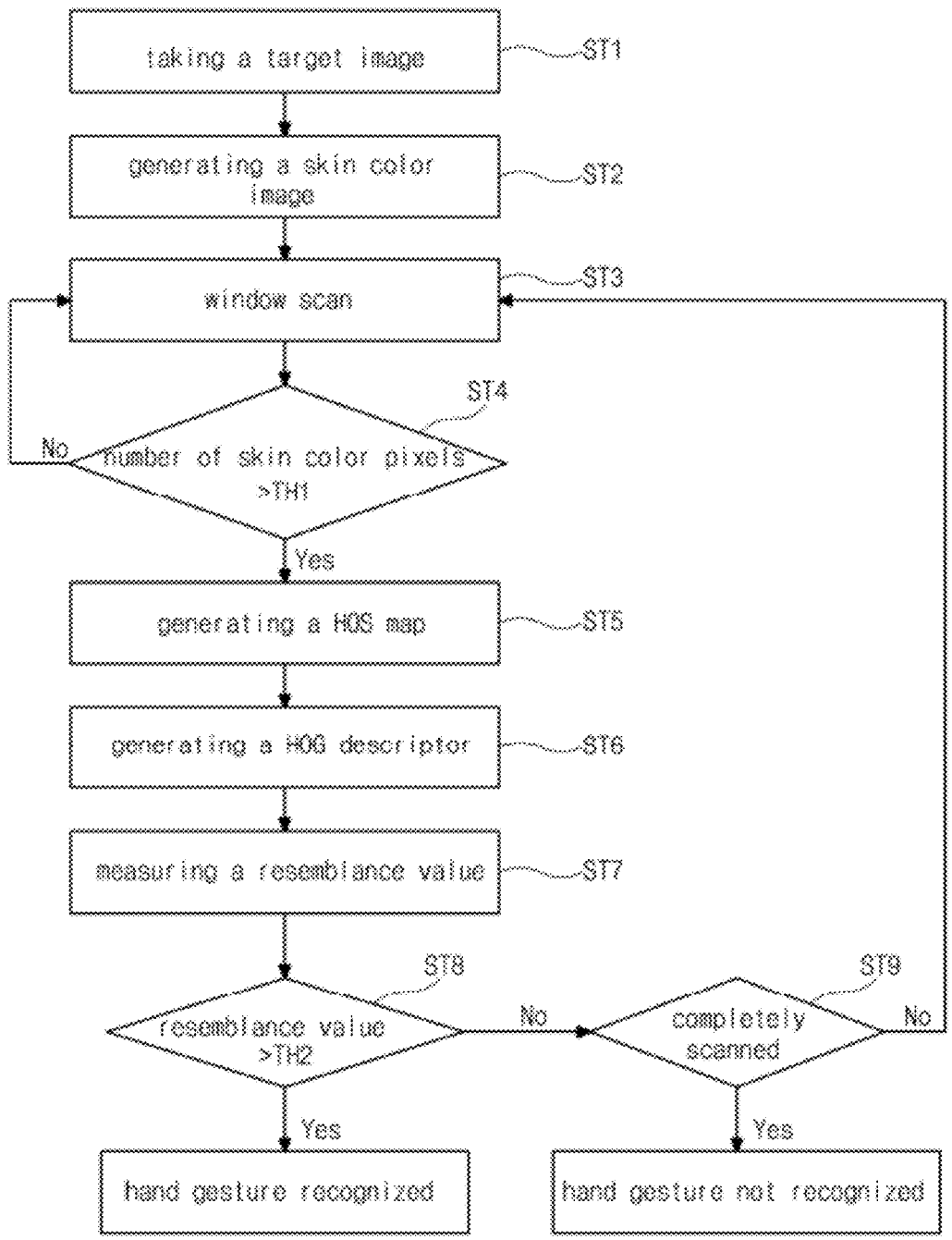
FIG. 2 is a schematic view illustrating a method to recognize a hand gesture according to the embodiment of the present invention.

FIG. 1 is a schematic view illustrating an apparatus including an interface to recognize a hand gesture according to an embodiment of the present invention, and FIG. 2 is a schematic view illustrating a method to recognize a hand gesture according to the embodiment of the present invention.

Referring to FIG. 1, the apparatus 10 may include an interface 100 and a control circuit 200.

The apparatus 10 may be defined as one of all types of apparatuses that are controlled and operated based upon information inputted through the interface 100 and uses electric power in operation. For example, various types of apparatuses, for example, a display device, such as a plasma display panel, a liquid crystal display, or an organic light emitting diode, a washing machine, a refrigerator, an air conditioner, an industrial equipment, and the like may be used as the apparatus 10 according to the embodiment. Accordingly, the apparatus 10 may be referred to as an electric-using apparatus 10.

The interface 100 may include an imaging element 110 and a hand gesture recognition portion 120.

A camera may be uses as the image element 110. The imaging element 110 takes images in front thereof, and the taken images are inputted by the frame into the hand gesture recognition portion 120.

The hand gesture recognition portion 120 detects and recognizes a hand gesture from the inputted images thereto.

The recognition result of the hand gesture is transferred to the control circuit 200. The control circuit 200 generates and outputs a control instruction corresponding to the recognition result of the hand gesture.

According to the control instruction, the electric-using apparatus 10 is controlled and operated. For example, when a display device is used as the apparatus 10, various instructions such as turning off a power, changing channels, adjusting a volume and the like may be conducted.

A method of recognizing a hand gesture according to the embodiment of the present invention is explained with reference to FIGS. 2 to 9.

Figure 3:
FIG. 3 is a picture illustrating an example of a target image inputted through the imaging element 110 according to the embodiment of the present invention.

A first step ST1 is performed that a portion viewed in front of the imaging element 110 is taken by the imaging element 110 so that images are obtained, and then the images are inputted to the hand gesture recognition portion 120. For the convenience of explanation, it is assumed that a frame image as an image that is inputted for a current frame to recognize a hand gesture may be referred to as a target image. FIG. 3 shows an example of a target image inputted through the imaging element 110 according to the embodiment of the present invention.

Then, a second step ST2 is performed that a skin color image is generated from the target image using a color model. It is preferred that a HSI (hue saturation intensity) color model is used as the color model. In the HSI color model, the "H" is a component that indicates a hue, the "S" is a component that indicates a saturation, and the "I" is a component that indicates an intensity.

Figure 4:
FIG. 4 is a picture illustrating an example of a skin color image generated according to the embodiment of the present invention.

Accordingly, by applying the HSI color model to each pixel of the inputted image, an image for a skin color can be generated. In other words, by detecting pixels having a skin color among the pixels of the target image, the skin color image that accentuates a skin color can be generated. The hue or both of the hue and the saturation may be used as a factor that determines the skin color. Accordingly, when the hue or the hue and the saturation of a pixel meets a predetermined skin color condition, it is determined that the pixel has a skin color. Accordingly, using the color model, the skin color image for the target image can be generated. FIG. 4 shows an example of a skin color image generated according to the embodiment of the present invention.

As described above, in the embodiment of the present invention, the skin color image may be generated through the HSI color model that uses hue information. Since the HSI color model uses hue information, it can detect a desired color, for example, a skin color faster than other color models, for example, a RGB color model, a YCbCr color model and the like. Accordingly, when the HSI color model is employed, a process of generating the skin color image can be conducted faster. This finally improves a rate of hand gesture recognition.

However, it should be understood that the above color models other than the HSI color model may be employed to generate the skin color image.

Then, third and fourth steps ST3 and ST4 are performed that the skin color image is scanned by a window WD that has a predetermined size, and whether a number of pixels of a skin color among pixels belonging to a region scanned by the window WD is greater than a first critical value TH1 or not is judged.

The window scan is explained with reference to FIG. 5 that is a view illustrating an example of the window scan according to the embodiment of the present invention.

Figure 5:
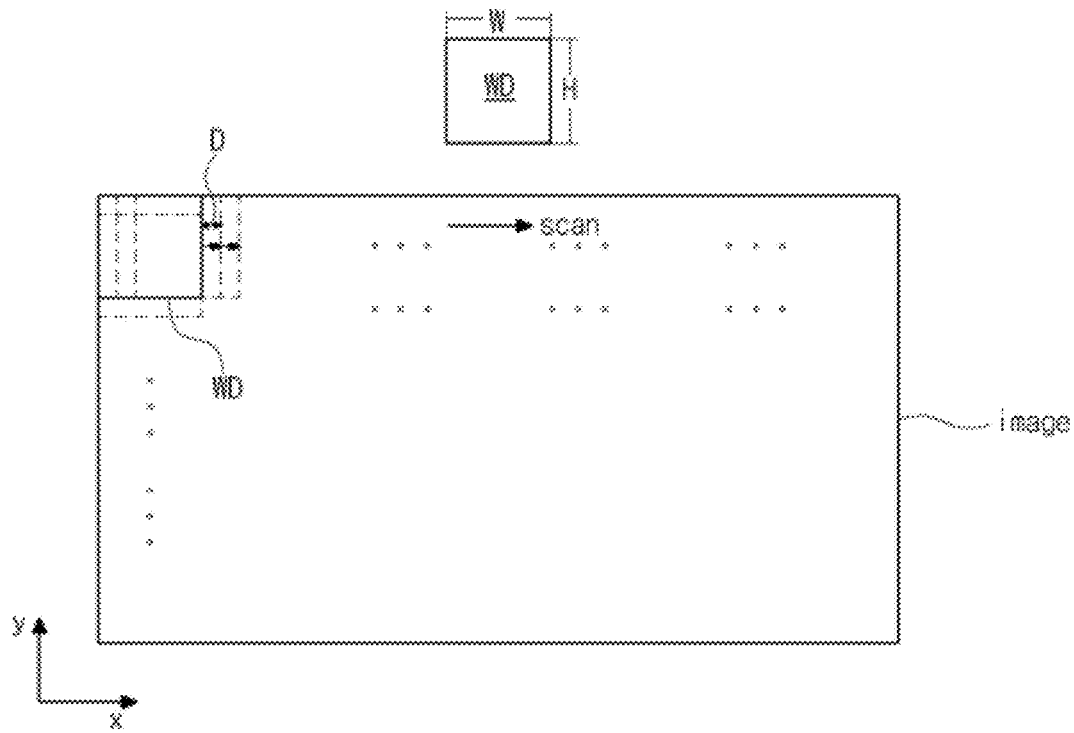
FIG. 5 is a view illustrating an example of the window scan according to the embodiment of the present invention.

Referring to FIG. 5, the window WD having a width W and a height H moves along a direction, for example, a row direction (i.e., a x direction) and performs scanning. One row i.e., a scan row is completely scanned, and then scanning a next scan row is performed.

A moving distance D of the window WD by the scan i.e., a distance between the neighboring window scans along the row direction may be less than the width W of the window WD. For example, a current scan region is scanned, then the window WD moves by a number of pixels less than a number of pixels corresponding to the width W, and then a next scan region is scanned. Accordingly, the neighboring scan regions along the row direction may overlap each other.

Further, neighboring scan regions along a column direction i.e., a y direction may overlap each other. For example, scanning a scan row is completely performed, then the window WD shifts by a number of pixels less than a number of pixels corresponding to the height H, and then a next scan row is scanned. Accordingly, the neighboring scan regions along the column direction may overlap each other.

It is preferred that the size of the window WD is configured to be the same as that of a query template for hand gesture. The query template for hand gesture is a particular hand shape model to recognize a corresponding hand gesture in the target image.

As described above, with respect to the scan region, whether a number of pixels of a skin color among pixels belonging to the scan region is greater than the first critical value TH1 or not is judged.

When the number of the pixels of a skin color is greater than the first critical value TH1, a fifth step ST5 of generating a HOS (high order statistics) map that is a next step is performed.

However, when the number of the pixels of a skin color is the first critical value TH1 or less, a move to the fifth step ST5 is not made but a return to the third step ST3 is made. In this case, the window WD moves and scans a next scan region.

As described above, the first critical value TH1 is considered as a reference to firstly determine possibility that the scan region includes a hand image. Particularly, when the number of pixels is the first critical value TH1 or less, it is judged that the scan region does not include a hand image, and accordingly, a return to the previous step ST3 instead of a move to the next step ST5 is made and the window scan is performed again.

By firstly judging that a hand image exists through whether the number of the pixels having a skin color satisfies the predetermined condition as above, follow-up steps are not performed for regions that does not include a hand image. Accordingly, a recognition rate of hand gesture can get fast.

Then, the fifth step ST5 is performed that the HOS map for the scan region is generated when a number of the pixels having a skin color in the scan region is greater than the first critical value TH1.

The HOS map is generated using a HOS (high order statistics) information. In other words, a HOS information for brightness of the pixels that belong to the scan region among the whole regions of the target image is found, and thus a feature space is changed.

To find a HOS information for each pixel, a second-order moment is calculated using a following first expression:

$$m^{(2)}(x, y, n) = \frac{1}{N_B} \sum_{(x,y) \in B(x,y)} (I(x, y, n) - \hat{m}(x, y, n))^2.$$

In the first expression, the B(x,y) is a set of a pixel at a coordinate (x,y) and the surrounding pixels, and the $N_B$ is a magnitude of the B(x,y). The I(x,y,n) is a brightness of the pixel at the coordinate (x,y) in a $n^{th}$ frame, and the $\hat{m}(x, y, n)$ is an average brightness of the B(x,y) in the $n^{th}$ frame. Regarding the first expression, since a range of the second-order moment may be much beyond a maximum value of image brightness, a top value of the range may be limited to a predetermined value, for example, the maximum value of image brightness. For example, when the top value is limited to "255", the HOS information is found by a following second expression:

$$HOS(x, y, n) = \text{MIN}\left(255, \frac{m^{(2)}(x, y)}{DSF}\right).$$

The DSF is a down scaling factor, and, in the embodiment, for example, "10" is assigned to the DSF.

Using the HOS information obtained through the first and second expressions as above, the HOS map for the scan region can be generated.

As described above, since the HOS map is generated using the HOS information, even though a noise occurs in the target image because of the imaging element 110 or the like, robust recognition of hand gesture can be made. This is explained with reference to FIGS. 6 to 8.

Figure 6:
FIG. 6 is a picture illustrating an example of a target image where a noise occurs.
Figure 7:
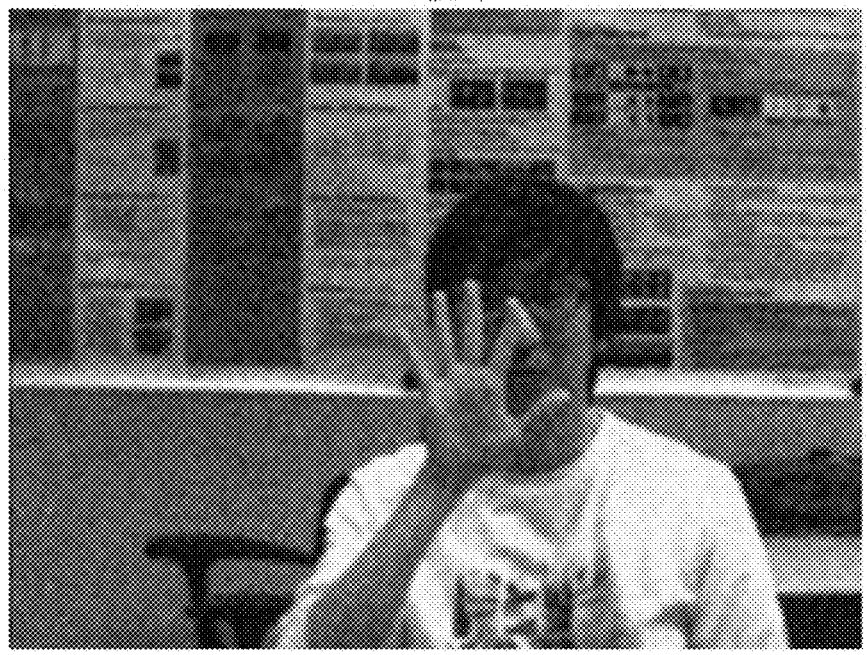
FIG. 7 is a picture illustrating an edge magnitude map for the target image of FIG. 6.
Figure 8:
FIG. 8 is a picture illustrating a HOS map, for the target image of FIG. 6, generated according to the embodiment of the present invention.

FIG. 6 shows an example of a target image where a noise occurs, FIG. 7 shows an edge magnitude map for the target image of FIG. 6, and FIG. 8 shows a HOS map, for the target image of FIG. 6, generated according to the embodiment of the present invention.

Comparing the edge magnitude map of FIG. 7 and the HOS map of FIG. 8, in the case that the noise exists in the target image, boundary of hand is preserved in the HOS map better than in the edge magnitude map.

As such, since the HOS map is employed, reliability of hand gesture recognition can be assured not only when an original image is itself inputted as the target image without noise but also when the target image has a noise.

Then, a sixth step ST6 is performed that a HOG (histograms of oriented gradients) descriptor for the scan region based upon the HOS map is generated.

A HOG descriptor for the query template may be generated, and this may be performed in the sixth step ST6, or may be performed prior to the sixth step ST6 and the HOG descriptor may be stored in a storage device. Generating the HOG descriptor for the query template means modeling a template hand gesture.

In generating the HOG descriptors, for each of the scan region and the query template, a histogram is generated by the block using magnitude and orientation of brightness gradient. The block is configured to have a size less than those of the window WD and the query template. For example, the block has a size of W/4*H/4, and the W and H are the width and height, respectively, of the window WD.

By connecting the histograms for all the blocks in each of the scan region and the query template, the HOG descriptor of each of the scan region and the query template can be generated. The histogram for the block of each of the query template and the scan region may be found by following third and fourth expressions. The third expression is $H_i^q = (h_{i,1}^q, h_{i,2}^q, \ldots, h_{i,K}^q)$, where $$h_{i,j}^q = \frac{E_{i,j}}{\sqrt{\sum_{i=1}^{K} (E_{i,j})^2 + \varepsilon}} \text{ and } E_{i,j} \sum_{\substack{(x,y) \in B_i \\ \theta(x,y) \in j}} m(x, y).$$

The fourth expression is $H_{r,i}^t(n) = (h_{r,i,1}^t(n), h_{r,i,2}^t(n), \ldots, h_{r,i,K}^t(n))$, where $$h_{r,i,j}^t(n) = \frac{E_{r,i,j}}{\sqrt{\sum_{i=1}^{K} (E_{r,i,l})^2 + \varepsilon}} \text{ and } E_{r,i,j} = \sum_{\substack{(x,y) \in B_{r,i} \\ \theta(x,y) \in j}} m(x, y).$$

The i is an index of block, and the K is a quantization level for orientation. The m(x,y) is a magnitude of brightness gradient of a pixel at a coordinate (x,y), and the θ(x,y) is a quantized orientation. The r and n are indexes of window scan and frame number, respectively. The ϵ is a small positive real number, for example, 0.00001, and it is set such that the denominator is not zero. The index of block is a factor indicating a location of the block, and the index of window scan is a factor indicating a location of the scan region.

By connecting the histograms obtained through the third and fourth expressions, the HOG descriptors for the query template and the scan region can be generated. The HOG descriptors for the query template and the scan region may be expressed as $H^q$ and $H_r^t(n)$, respectively.

The blocks neighboring along the x direction and the y direction may be configured to overlap each other. For example, the neighboring blocks along the x direction may overlap each other by half a width of the block, and the neighboring blocks along the y direction may overlap each other by half a height of the block. However, it should be understood that the overlap width and height may vary.

Figure 9:
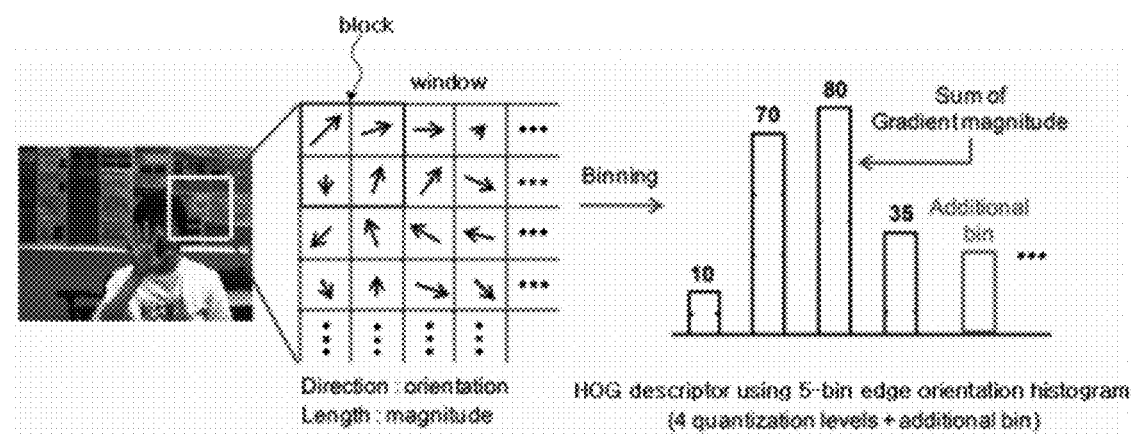
FIG. 9 is a view illustrating an example of processes of generating the HOG descriptor according to the embodiment of the present invention.

FIG. 9 shows an example of processes of generating the HOG descriptor according to the embodiment of the present invention. In FIG. 9, it is shown that the HOG descriptor is generated for the region of the left target image scanned by the rectangular window.

Referring to FIG. 9, magnitude and orientation of brightness gradient for each of pixels in the scan region are represented by an arrow. A length of the arrow is the magnitude of brightness gradient.

For the scan region, histograms are generated by the block and are connected to finally generate a HOG descriptor. In FIG. 9, it is shown that the HOG descriptor is generated using a 5-bin edge orientation histogram. In this case, the 5 bins may include 4 bins (which are sequentially shown from left to right) corresponding to 4 quantization levels (to which a range from over 0 degree to 45 degrees, a range from over 45 degrees to 90 degrees, a range from over 90 degrees to 135 degrees, and a range from over 135 degrees and 180 degrees are assigned, respectively), and an additional bin. The additional bin is for an orientation of 0 degree.

Then, to judge the scan region includes a hand gesture corresponding to the query template, a template-matching with the modeled hand gesture is performed. To do this, for example, a seventh step ST7 is performed that a resemblance value between the HOG descriptor of the query template and the HOG descriptor of the scan region is measured.

To measure the resemblance value, a cosine similarity may be used. The resemblance value through the cosine similarity is measured in a following fifth expression:

$$f(\rho_r) = \frac{\rho_r}{1-\rho_r},$$

where $$\rho_r(H^q, H_r^t(n)) = \frac{(H^q)^T H_r^t(n)}{\|H^q\| \|H_r^t(n)\|}.$$

The $(H^q)^T$ is a permutation matrix of the $H^q$, the $\rho_r$ is a cosine similarity, and $f(\rho_r)$ is a resemblance value measurement function.

Then, an eighth step ST8 is performed that whether the resemblance value measured through the fifth expression is greater than a second critical value TH2 or not is judged.

When the resemblance value is greater than the second critical value TH2, it is judged that the scan region includes the hand gesture of the query template. Accordingly, the hand gesture is recognized.

When the resemblance value is the second critical value TH2 or less, it is judged that the scan region does not include the hand gesture of the query template.

As described above, through whether the similarity between the HOG descriptor of the query template and the HOG descriptor of the scan region meets the predetermined condition or not, whether the hand gesture of the query template exists in the scan region or not can be judged.

A plurality of query templates corresponding to a plurality of control instructions, respectively, may be prepared. In this case, priority numbers may be assigned to the plurality of query templates. Accordingly, when a similarity to a query template having a priority number fails to meet a predetermined condition, a process of judging whether a similarity to a query template having a next-lower priority number meets or not is performed.

When the resemblance value is the second critical value TH2 or less, a ninth step ST9 is performed that whether the whole target image is completely scanned or not is judged.

When the complete scan is not done, a return to the third step ST3 is made and the following steps as above are repeated.

When the complete scan is done, it is finally determined that the target image does not include the hand gesture of the query template. In other words, the hand gesture is not recognized.

Alternatively, when it is determined that the scan region includes the hand gesture, a step of judging whether the whole target image is completely scanned or not may be performed. In this case, a return to the third step ST3 may be made when the complete scan is not done. This may be usefully applied to, for example, multi-gesture recognition when using both hands.

When the hand gesture is recognized according to the above-described method, the corresponding control instruction is made, and the electric-using apparatus 10 operates according to the control instruction.

When the hand gesture is not recognized, for example, a previous control instruction may be kept, and operation of the electric-using apparatus 10 may be kept without variation.

As described above, in the embodiment of the present invention, in order to recognize a hand gesture, a skin color region is detected from a target image, then a skin color image is generated based upon the detected skin color region, then a window scan is performed for the skin color image, then a HOS map is generated when a number of skin color pixels of the scan region meets a predetermined condition, then a HOG descriptor of the scan region is generated based upon the HOS map, and then a similarity of the HOG descriptor of the scan region and a HOG descriptor of a query template is judged.

As such, when the number of the skin color pixels meets the predetermined condition, follow-up steps are performed. Accordingly, a rate of hand gesture recognition can be remarkably fast.

Further, even though a noise is included in the inputted target image, the step of generating the HOS map to remove the noise is included. Accordingly, accuracy and reliability of hand gesture recognition can be improved.

Further, a query template is used for hand gesture recognition. Accordingly, time and cost can be reduced compared to the related art learning-based method using many amounts of data sets.

Further, since a hand shape is effectively modeled using the HOG descriptor based upon the HOS map, the method of the embodiment is robust to variation of lighting, and a hand region can be accurately recognized even when a skin color background exists or overlap with other body parts occurs.

Therefore, according to the embodiment of the present invention, reliability and efficiency of hand gesture recognition can be improved.

FIGS. 10 to 13 are pictures illustrating results of hand gesture recognition under various surroundings according to the embodiment of the present invention.

Figure 10:
FIGS. 10 to 13 are pictures illustrating results of hand gesture recognition under various surroundings according to the embodiment of the present invention.
Figure 11:
Figure 12:
Figure 13:

FIGS. 10 and 13 show the result under the surroundings where a movement exists in a background, the result under the surroundings where a complicated configuration exists in a background, the result under the surroundings where a hand and a face overlap, and the result under the surroundings where a skin color background exists extensively, respectively.

Referring to FIGS. 10 and 13, a hand shape is accurately recognized even under various surroundings.

In the embodiment as above, the method of recognizing a hand gesture is explained as an example. However, it should be understood that the method can be applied to recognizing gestures of organs, such as a foot, an arm, a leg, a head and the like, that are able to visually express user's intent i.e., dynamic organs.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of recognizing a user's dynamic organ for use in an electric-using apparatus, the method comprising:
generating a skin color image from a target image inputted through an imaging element;
scanning the skin color image using a window;
generating a HOG descriptor of a region of the skin color image that is scanned when it is judged that the scanned region includes a dynamic organ;
measuring a resemblance value between the HOG descriptor of the scanned region and a HOG descriptor of a query template for a gesture of the dynamic organ; and
judging that the scanned region includes the gesture of the dynamic organ when the resemblance value meets a predetermined condition,
wherein generating the HOG descriptor of the scanned region includes:
generating a HOS (high order statistics) map for the scanned region using a HOS information for brightness of the scanned region; and
generating the HOG descriptor of the scanned region based upon the HOS map,
wherein the HOS information is found through second and third expressions,
wherein the second expression is $$m^{(2)}(x, y) = \frac{1}{N_B} \sum_{(x,y) \in B(x,y)} (I(x, y) - \hat{m}(x, y))^2$$

(where the B(x,y) is a set of a pixel at a coordinate (x,y) and the surrounding pixels, the $N_B$ is a magnitude of the B(x,y), the I(x,y) is a brightness of the pixel at the coordinate (x,y), the $\hat{m}(x,y)$ is an average brightness of the B(x,y), and the $m^{(2)}(x, y)$ is a second-order moment), and wherein the third expression is $$HOS(x, y) = \text{MIN}\left(UL, \frac{m^{(2)}(x, y)}{DSF}\right)$$

(where the UL is a top limit value, and the DSF is a down scaling factor), and
wherein generating the skin color image from the target image includes applying a HSI (hue saturation intensity) color model to the target image to generate the skin color image.

2. The method according to claim 1, wherein it is judged that the scanned region includes the dynamic organ when a number of pixels having a skin color among pixels belonging to the scanned region meets a predetermined condition.

3. The method according to claim 1, wherein generating the HOG descriptor of the scanned region based upon the HOS map includes:
generating histograms for respective blocks using magnitude and orientation of brightness gradient of the pixel of the scanned region; and
generating the HOG descriptor of the scanned region by connecting the histograms,
wherein the block has a size less than that of the window, and the neighboring blocks overlap each other.

4. The method according to claim 1, wherein the resemblance value is measured through a first expression using a cosine similarity between the HOG descriptor of the scanned region and the HOG descriptor of the query template, and
wherein the first expression is $$f(\rho_r) = \frac{\rho_r}{1 - \rho_r},$$

where $$\rho_r(H^q, H_r^t) = \frac{(H^q)^T H_r^t}{\|H^q\| \|H_r^t\|}$$

(where the $H^q$ is the HOG descriptor of the query template, the $H_r^t$ is the HOG descriptor of the scanned region, the $(H^q)^T$ is a permutation matrix of the $H^q$, the $\rho_r$ is the cosine similarity, and the $f(\rho_r)$ is a resemblance value measurement function).

5. The method according to claim 1, wherein, among regions of the skin color image scanned by the window, the neighboring regions along a width direction of the window overlap each other, and the neighboring regions along a length direction of the window overlap each other.

6. The method according to claim 1, wherein the dynamic organ is one of a hand, a foot, a head, an arm, and a leg.

7. An interface for use in an electric-using apparatus, the interface comprising:
- an imaging element; and
- a dynamic organ gesture recognition portion that generates a skin color image from a target image inputted through an imaging element; scans the skin color image using a window; generates a HOG descriptor of a region of the skin color image that is scanned when it is judged that the scanned region includes a dynamic organ; measures a resemblance value between the HOG descriptor of the scanned region and a HOG descriptor of a query template for a gesture of the dynamic organ; and judges that the scanned region includes the gesture of the dynamic organ when the resemblance value meets a predetermined condition,
- wherein the dynamic organ gesture recognition portion generates a HOS (high order statistics) map for the scanned region using a HOS information for brightness of the scanned region, and generates the HOG descriptor of the scanned region based upon the HOS map,
- wherein the HOS information is found through second and third expressions,
- wherein the second expression is $$m^{(2)}(x, y) = \frac{1}{N_B} \sum_{(x,y) \in B(x,y)} (I(x, y) - \hat{m}(x, y))^2$$

(where the B(x,y) is a set of a pixel at a coordinate (x,y) and the surrounding pixels, the $N_B$ is a magnitude of the B(x,y), the I(x,y) is a brightness of the pixel at the coordinate (x,y), the $\hat{m}(x, y)$ is an average brightness of the B(x,y), and the $m^{(2)}(x,y)$ is a second-order moment), and wherein the third expression is $$HOS(x, y) = MIN\left(UL, \frac{m^{(2)}(x, y)}{DSF}\right)$$

(where the UL is a top limit value, and the DSF is a down scaling factor), and
wherein the dynamic organ gesture recognition portion applies a HSI (hue saturation intensity) color model to the target image to generate the skin color image.

8. The interface according to claim 7, wherein the dynamic organ gesture recognition portion judges that the scanned region includes the dynamic organ when a number of pixels having a skin color among pixels belonging to the scanned region meets a predetermined condition.

9. The interface according to claim 7, wherein the dynamic organ gesture recognition portion generates histograms for respective blocks using magnitude and orientation of brightness gradient of the pixel of the scanned region, and generates the HOG descriptor of the scanned region by connecting the histograms, and
wherein the block has a size less than that of the window, and the neighboring blocks overlap each other.

10. The interface according to claim 7, wherein the resemblance value is measured through a first expression using a cosine similarity between the HOG descriptor of the scanned region and the HOG descriptor of the query template, and
wherein the first expression is $$f(\rho_r) = \frac{\rho_r}{1 - \rho_r},$$

where $$\rho_r(H^q, H_r^t) = \frac{(H^q)^T H_r^t}{\|H^q\| \|H_r^t\|}$$

(where the $H^q$ is the HOG descriptor of the query template, the $H_r^t$ is the HOG descriptor of the scanned region, the $(H^q)^T$ is a permutation matrix of the $H^q$, the $\rho_r$ is the cosine similarity, and the $f(\rho_r)$ is a resemblance value measurement function).

11. The interface according to claim 7, wherein, among regions of the skin color image scanned by the window, the neighboring regions along a width direction of the window overlap each other, and the neighboring regions along a length direction of the window overlap each other.

12. The interface according to claim 7, wherein the dynamic organ is one of a hand, a foot, a head, an arm, and a leg.

13. An electric-using apparatus, comprising:
- an interface including a dynamic organ gesture recognition portion that generates a skin color image from a target image inputted through an imaging element; scans the skin color image using a window; generates a HOG descriptor of a region of the target image that is scanned when it is judged that the scanned region includes a dynamic organ; measures a resemblance value between the HOG descriptor of the scanned region and a HOG descriptor of a query template for a gesture of the dynamic organ; and judges that the scanned region includes the gesture of the dynamic organ when the resemblance value meets a predetermined condition; and
- a control circuit that controls operation of the electric-using apparatus according to recognition result of the gesture of the dynamic organ from the interface,
- wherein the dynamic organ gesture recognition portion generates a HOS (high order statistics) map for the scanned region using a HOS information for brightness of the scanned region, and generates the HOG descriptor of the scanned region based upon the HOS map,
- wherein the HOS information is found through second and third expressions,
- wherein the second expression is $$m^{(2)}(x, y) = \frac{1}{N_B} \sum_{(x,y) \in B(x,y)} (I(x, y) - \hat{m}(x, y))^2$$

(where the B(x,y) is a set of a pixel at a coordinate (x,y) and the surrounding pixels, the $N_B$ is a magnitude of the B(x,y), the I(x,y) is a brightness of the pixel at the coordinate (x,y), the $\hat{m}(x, y)$ is an average brightness of the B(x,y), and the $m^{(2)}(x,y)$ is a second order moment), and wherein the third expression is $$HOS(x, y) = \text{MIN}\left(UL, \frac{m^{(2)}(x, y)}{DSF}\right)$$

(where the UL is a top limit value, and the DSF is a down scaling factor), and wherein the dynamic organ gesture recognizing portion applies a HSI (hue saturation intensity) color model to the target image to generate the skin color image.

14. The apparatus according to claim 13, wherein the dynamic organ gesture recognition portion judges that the scanned region includes the dynamic organ when a number of pixels having a skin color among pixels belonging to the scanned region meets a predetermined condition.

15. The apparatus according to claim 13, wherein the dynamic organ gesture recognition portion generates histograms for respective blocks using magnitude and orientation of brightness gradient of the pixel of the scanned region, and generates the HOG descriptor of the scanned region by connecting the histograms, and wherein the block has a size less than that of the window, and the neighboring blocks overlap each other.

16. The apparatus according to claim 13, wherein the resemblance value is measured through a first expression using a cosine similarity between the HOG descriptor of the scanned region and the HOG descriptor of the query template, and wherein the first expression is $$f(\rho_r) = \frac{\rho_r}{1 - \rho_r},$$

where $$\rho_r(H^q, H_r^t) = \frac{(H^q)^T H_r^t}{\|H^q\| \|H_r^t\|}$$

(where the $H^q$ is the HOG descriptor of the query template, the $H_r^t$ is the HOG descriptor of the scanned region, the $(H^q)^T$ is a permutation matrix of the $H^q$, the $\rho_r$ is the cosine similarity, and the $f(\rho_r)$ a resemblance value measurement function).

17. The apparatus according to claim 13, wherein, among regions of the skin color image scanned by the window, the neighboring regions along a width direction of the window overlap each other, and the neighboring regions along a length direction of the window overlap each other.

18. The apparatus according to claim 13, wherein the dynamic organ is one of a hand, a foot, a head, an arm, and a leg.

* * * * *